C. M. PAGE.
DYNAMO ELECTRIC MACHINE.
APPLICATION FILED MAY 2, 1910.

986,748.

Patented Mar. 14, 1911.

2 SHEETS—SHEET 1.

Witnesses:
J. C. Devick.
C. Paul Parker.

Inventor:
Carl M. Page
By Luther L. Miller
Attorney.

C. M. PAGE.
DYNAMO ELECTRIC MACHINE.
APPLICATION FILED MAY 2, 1910.

986,748.

Patented Mar. 14, 1911.

2 SHEETS—SHEET 2.

Witnesses:
J. C. Devick.
C. Paul Parker.

Inventor:
Carl M. Page
By Luther L. Miller
Attorney.

UNITED STATES PATENT OFFICE.

CARL M. PAGE, OF CHICAGO, ILLINOIS, ASSIGNOR OF ONE-HALF TO HORACE D. REYNOLDS, OF CHICAGO, ILLINOIS.

DYNAMO-ELECTRIC MACHINE.

986,748.  Specification of Letters Patent.  Patented Mar. 14, 1911.

Original application filed December 13, 1909, Serial No. 532,878. Divided and this application filed May 2, 1910. Serial No. 558,913.

*To all whom it may concern:*

Be it known that I, CARL MADISON PAGE, a citizen of the United States, residing at Chicago, in the county of Cook and State of Illinois, have invented certain new and useful Improvements in Dynamo-Electric Machines, of which the following is a specification.

This invention relates to dynamo-electric machines, and contemplates a machine having two electrically independent field-windings, as a series winding and a shunt winding, either one of which is adapted to be placed in service, depending upon the characteristics which it is desirable for the machine to have to properly and efficiently perform its work. For example, when the machine is to be used as a motor, the use of the series field-winding enables the motor to exert a high torque in starting, and it will therefore start under a heavy load. On the other hand, when the machine is to be operated as a generator, if the shunt field-winding is used, the field may be separately excited to bring it up to full strength and the armature may be driven at full speed, before the armature circuit is closed, so that upon closing said armature circuit, the machine will immediately generate its maximum output.

I have herein shown the invention in use upon an automobile, and it is particularly well adapted for such use. When used upon an automobile, the dynamo-electric machine may be connected with the drive shaft of the engine and may be arranged to be driven from a suitable source of electrical energy, such as a storage battery, to turn the engine over in starting the latter. When the engine has been started, the machine may be operated as a generator driven from the engine to supply current for the igniter of the engine, for charging the storage battery above referred to, and for various other desired purposes.

Figure 1:
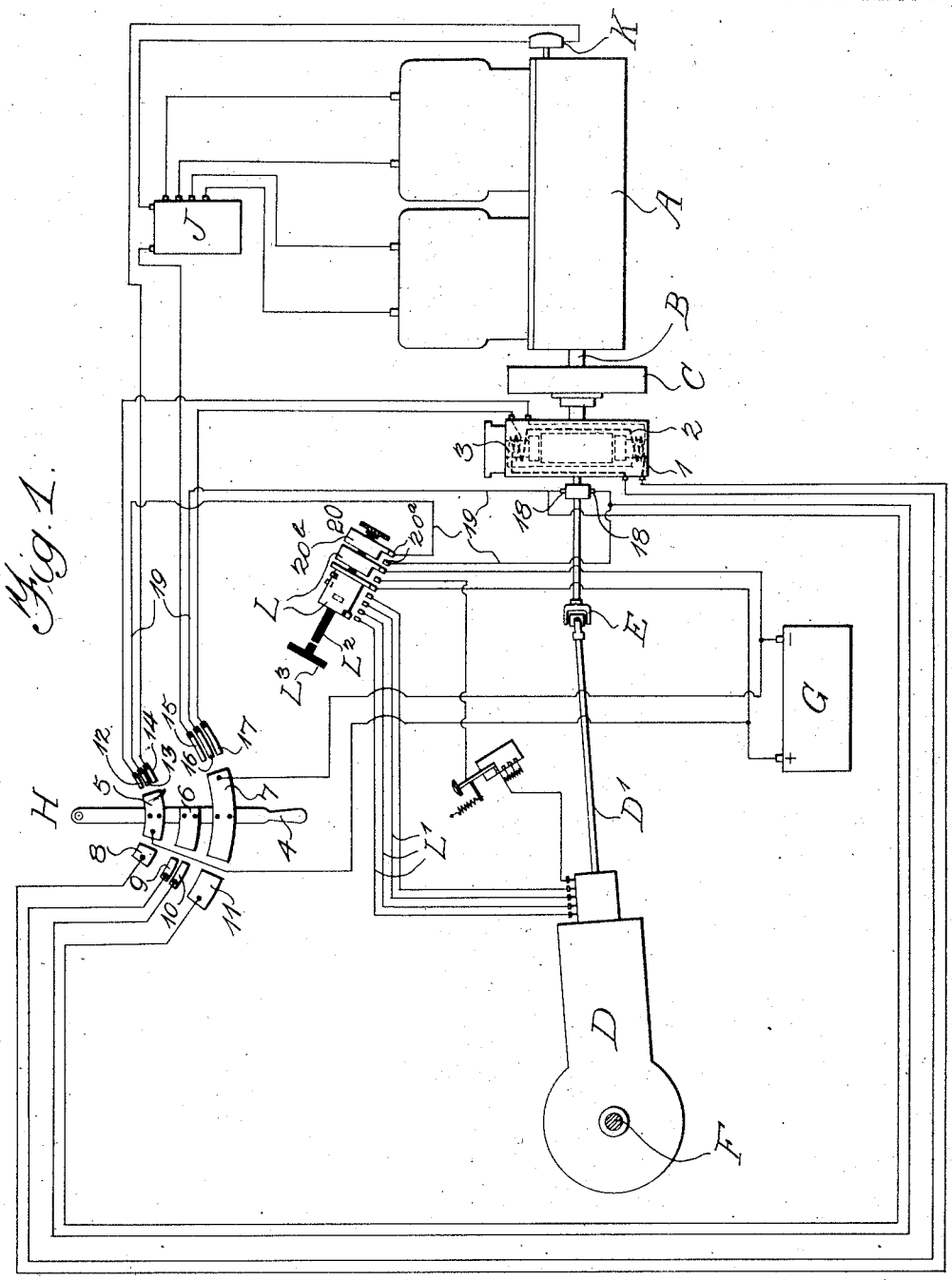
Figure 2:
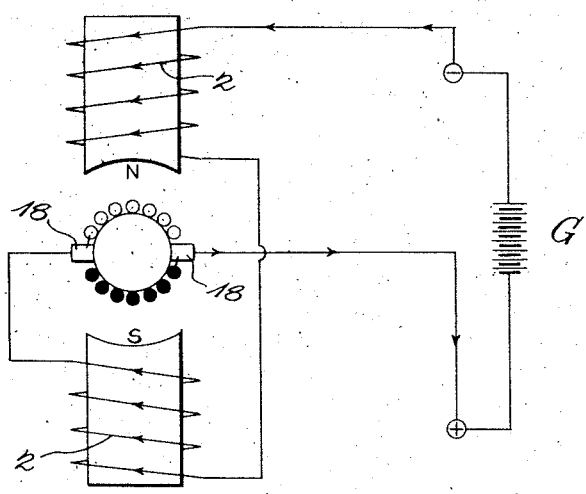
Figure 3:
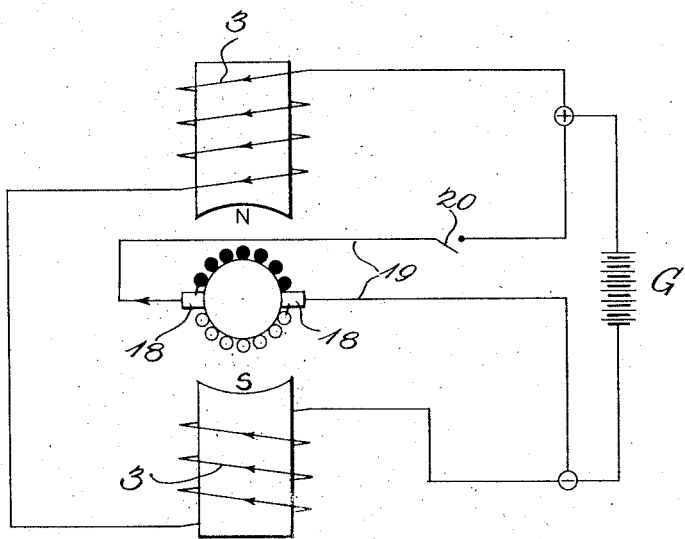

In the accompanying drawings, Figure 1 illustrates diagrammatically the various parts of an automobile and shows the manner in which my invention may be applied thereto. Fig. 2 is a conventional representation of the machine showing the winding in use when the machine is operated as a motor. Fig. 3 is a similar view showing the winding and connections used when the machine is to be operated as a generator.

Referring to Fig. 1: A indicates the engine, B its drive shaft, and C the usual fly wheel mounted on said shaft. A machine 1 embodying my invention may be connected to the engine shaft B in any desired way, but preferably the rotor is mounted directly upon said shaft. D indicates a suitable transmission mechanism, which may be coupled with the engine shaft B by means of a shaft D′ and a universal joint E to transmit power from the engine to the rear axle F.

Either of the two independent field windings 2 and 3 for the dynamo 1 are arranged to be brought into service at the proper time by means of a suitable switch H. Said switch is herein shown as of the double throw type and comprises a movable lever 4 having contacts 5, 6 and 7 thereon adapted to be moved in one direction into engagement with contacts 8, 9, 10 and 11, in which position the contact 6 on the lever 4 bridges the contacts 9 and 10. The lever 4 is movable in another direction to bring the contacts 5 and 7 into engagement with a set of contacts 12, 13, 14, 15, 16 and 17. The contacts 5 and 7 on the movable switch member 4 are connected to a storage battery G. The series field-winding 2 of the dynamo is connected with the contacts 8 and 9 of the switch H, the brushes 18 for the armature being connected to the contacts 10 and 11 of said switch. It will be seen that when the switch member 4 is moved to the left to bring the contacts 5, 6, 7 into engagement with the contacts 8, 9, 10, 11 the series winding 2 and the armature will be connected up with the storage battery G. The machine 1 will then be driven as a motor from the battery G to start the engine. The shunt-field winding 3 for the dynamo-electric machine is connected with the contacts 12 and 17 of the switch H.

J indicates the induction coils of the ignition apparatus, and K the timer for the engine A. Said igniter and timer may be connected with the contacts 14 and 15 of switch H. The brushes 18 for the armature are connected through the medium of wires 19 with the contacts 13 and 16 of the switch H. In one of the wires 19 is a switch 20 of any suitable form, the one herein shown being of the rotary type and comprising a pair of contacts 20ᵃ arranged to be connected by a rotary switch member 20ᵇ.

If desired, the transmission mechanism D may be electrically operated and may be connected in circuit with the battery G through the medium of wires L' and switches L. In the present application of my invention it is convenient to mount the switch 20 on an operating staff L² along with the switch members L', said staff having a hand wheel L³ thereon to be operated by the driver of the automobile.

When the dynamo-electric machine 1 has been driven as a motor to turn the engine shaft a sufficient number of times, as hereinbefore described, the movable member 4 of the switch H is moved to the right to bring the contacts 5 and 7 into engagement with the sets of contacts 12, 13, 14 and 15, 16, 17, respectively. As will be seen, current may now flow from the battery G, through contacts 5, 7, 14, 15 of switch H to the ignition apparatus J and the timer K. A charge in the engine A is thus ignited and the engine drives the armature of the machine 1. Current will also flow from the battery G through the shunt-field winding 3 and will immediately bring the field of the dynamo up to its full strength. The generator-armature circuit, however, is open at switch 20, and the machine will generate no current until said armature circuit is closed. When the driver is ready to start the automobile he rotates the staff L² to close the switch 20, when the machine 1 will immediately generate its maximum output for operating the transmission mechanism D, the ignition system, etc.

From the foregoing it will be understood that when the engine is to be started, the dynamo-electric machine 1 is enabled to exert a high torque at starting by reason of the field winding 2 being in service; and that when the machine is converted into a generator, it will furnish immediately a maximum current for charging the battery and operating the transmission and other parts which may be connected in circuit.

Certain features of this invention are shown and described in my copending applications Serial Nos. 532,878 and 532,879, filed December 13, 1909. This application is a division of my said application Serial No. 532,878.

I claim as my invention:

1. A dynamo-electric machine capable of use as a generator and as a motor and comprising an armature and two electrically-independent field windings, and means for placing either of said windings in service.

2. A dynamo-electric machine capable of use as a generator and as a motor and comprising an armature, a shunt field winding and a series field winding, said windings being electrically independent, and means for placing either of said windings in service.

3. The combination with a dynamo-electric machine comprising an armature, a series field winding and a shunt field winding, said windings being electrically independent, of switch means for controlling said machine, said series field winding and said armature being connected to one portion of said switch means, and said shunt field winding and said armature being connected to another portion of said switch means, so that by operating said switch means said machine may be run either as a series wound or as a shunt wound machine.

4. The combination with a dynamo-electric machine comprising an armature and two electrically independent field windings, of a double throw switch for controlling said machine, said field windings being connected to opposite sides of said switch, and connections between said armature and opposite sides of said switch.

5. The combination with a dynamo-electric machine comprising an armature and two electrically independent field windings, of a double throw switch for controlling said machine, said field windings being connected to opposite sides of said switch, and connections between said armature and opposite sides of said switch, one of the last mentioned connections having a switch therein.

6. The combination with a dynamo-electric machine comprising an armature, a series field winding and a shunt field winding, said windings being electrically independent, of a double throw switch for controlling said machine, said series field winding and said armature being connected to one side of said switch, said shunt field winding and said armature being connected to the opposite side of said switch, and a switch in the last mentioned armature connection.

CARL M. PAGE.

Witnesses:
J. RAYMOND BARSE,
GEORGE L. CHINDAHL.